(12) United States Patent
Chen et al.

(10) Patent No.: US 11,929,985 B2
(45) Date of Patent: *Mar. 12, 2024

(54) NETWORK-BASED AUTHENTICATION RULE CLEANING AND OPTIMIZATION

(71) Applicant: The Western Union Company, Denver, CO (US)

(72) Inventors: Chaoyun Chen, San Francisco, CA (US); Quan Li, Fremont, CA (US); Zifang Huang, Redwood City, CA (US)

(73) Assignee: The Western Union Company, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,757

(22) Filed: Mar. 24, 2023

(65) Prior Publication Data

US 2023/0328036 A1  Oct. 12, 2023

Related U.S. Application Data

(63) Continuation of application No. 16/837,298, filed on Apr. 1, 2020, now Pat. No. 11,627,113.

(51) Int. Cl.
*H04L 9/40* (2022.01)
*G06N 7/01* (2023.01)
*G06N 20/00* (2019.01)
*H04L 41/0893* (2022.01)

(52) U.S. Cl.
CPC ......... *H04L 63/0263* (2013.01); *G06N 7/01* (2023.01); *G06N 20/00* (2019.01); *H04L 41/0893* (2013.01)

(58) Field of Classification Search
CPC ...... H04L 63/0263; H04Q 2213/13515; H04N 2201/324; H04N 21/441
USPC .......................................................... 726/3
See application file for complete search history.

(56) References Cited

U.S. PATENT DOCUMENTS

| | | | |
|---|---|---|---|
| 10,373,140 B1* | 8/2019 | Chang | G06F 16/24575 |
| 2007/0192474 A1 | 8/2007 | Decasper et al. | |
| 2016/0070758 A1 | 3/2016 | Thomson et al. | |
| 2016/0149887 A1 | 5/2016 | Katmor et al. | |
| 2017/0193395 A1 | 7/2017 | Limonad et al. | |
| 2017/0302702 A1* | 10/2017 | Hu | G06F 21/554 |
| 2019/0260742 A1 | 8/2019 | Arora et al. | |

(Continued)

*Primary Examiner* — Meng Vang
(74) *Attorney, Agent, or Firm* — Kilpatrick Townsend & Stockton LLP

(57) ABSTRACT

Techniques and systems for optimizing and cleaning rules for network-based authentication transactions are provided herein. A network-based authentication system may determine a plurality of rules that were previously used to evaluate a plurality of transactions. The network-based authentication system may also generate a false positive rate for one or more of the plurality of rules, A cleaning coefficient for a first rule of the plurality of rules may be generated by the network-based authentication system. Based on the cleaning coefficient and the false positive rate, the network-based authentication system may identify one or more rules from the plurality of rules to eliminate from the plurality of rules. The network-based authentication system may eliminate the one or more rules to generate a modified set of rules. Using the modified set of rules, the network-based authentication system may authenticate a network transaction.

20 Claims, 8 Drawing Sheets

(56) References Cited

U.S. PATENT DOCUMENTS

| | | | |
|---|---|---|---|
| 2020/0244705 A1 | 7/2020 | Zaslavsky et al. | |
| 2020/0401697 A1* | 12/2020 | Smith | G06N 20/00 |
| 2021/0004798 A1* | 1/2021 | Stark | G06V 30/414 |
| 2021/0067489 A1* | 3/2021 | Jayawardena | H04L 67/1097 |
| 2021/0096974 A1* | 4/2021 | Ranchal | G06N 20/00 |

* cited by examiner

| RULES | 04/2018 | 05/2018 | 06/2018 | 07/2018 | 08/2018 | 09/2018 | 10/2018 |
|---|---|---|---|---|---|---|---|
| DecACHT1DMSameState | 0 | 0 | 0 | 809 | 2079 | 1892 | 2531 |
| DecACHT1DeviceAlias | 719 | 1083 | 831 | 475 | 414 | 446 | 486 |
| DecACHT1EmailScore | 250 | 396 | 625 | 313 | 269 | 310 | 382 |
| DecACHT1SSMAXVGHPMT | 0 | 0 | 0 | 57 | 126 | 132 | 146 |
| DecACHT1SSVGGTEq7K | 0 | 0 | 0 | 12 | 15 | 13 | 6 |

FIG. 2

| | Time Segment | No. of Rules | No. of Transactions | No. of Fraud Transactions | Fraud Rates |
|---|---|---|---|---|---|
| Normal Group | 0.0 | 44 | 378 | 9 | 0.024 |
| | 1.0 | 240 | 789,168 | 98,255 | 0.125 |
| | 2.0 | 161 | 526,165 | 123,425 | 0.235 |
| | 3.0 | 108 | 155,837 | 22,796 | 0.146 |
| | 4.0 | 101 | 99,475 | 9,242 | 0.093 |
| | 5.0 | 168 | 800,846 | 51,782 | 0.065 |
| | Total Time Segment | 822 | 2,371,869 | 305,509 | 0.129 |

FIG. 4

| | Rules | λ=0.0 | λ=0.1 | λ=0.2 | λ=0.3 |
|---|---|---|---|---|---|
| Normal Group | num_eliminate_rules | 0 | 11 | 15 | 15 |
| | num_dcc_bad | 43,387 | 43,387 | 43,386 | 43,386 |
| | num_dcc_good | 564,361 | 564,360 | 564,345 | 564,345 |
| | False Positive Rate | 13.01 | 13.01 | 13.01 | 13.01 |
| | num_dcc_bad_app | 0 | 0 | 1 | 1 |
| | num_dcc_good_app | 0 | 1 | 16 | 16 |
| | amt_bad_app | 0 | 0 | 650 | 650 |
| | amt_good_app | 0 | 50,000 | 54,280 | 54,280 |
| | amt_diff | 0 | 50,00 | 53,630 | 53,630 |
| Normal Group | num_eliminate_rules | 0 | 11 | 15 | 15 |
| | num_dcc_bad | 676 | 676 | 676 | 676 |
| | num_dcc_good | 1,798 | 1,798 | 1,798 | 1,798 |
| | False Positive Rate | 2.66 | 2.66 | 2.66 | 2.66 |
| | num_dcc_bad_app | 0 | 0 | 0 | 0 |
| | num_dcc_good_app | 0 | 0 | 0 | 0 |
| | amt_bad_app | 0 | 0 | 0 | 0 |
| | amt_good_app | 0 | 0 | 0 | 0 |
| | amt_diff | 0 | 0 | 0 | 0 |

FIG. 5

NETWORK-BASED AUTHENTICATION RULE CLEANING AND OPTIMIZATION

CROSS REFERENCE TO RELATED APPLICATION

This application is a continuation of U.S. patent application Ser. No. 16/837,298 filed Apr. 1, 2020, which is hereby incorporated by reference herein for all purposes.

BACKGROUND

Many authentication systems utilize rules to mitigate and minimize fraudulent activity. However, fraudulent activity is dynamic, often changing over time, rendering some of the rules used to mitigate the fraudulent activity inadequate, obsolete, or outdated. Thus, to keep up with the new fraudulent activity, new rules are added to existing rules in an authentication system. Because understanding the interaction of rules is often difficult, cleaning or removing outdated or duplicative rules can be time consuming and costly. Accordingly, there is a need to systematically optimize and clean rules within an authentication system.

SUMMARY

Techniques disclosed herein described systems, non-transitory computer-readable mediums, and methods for managing rules for a network-based authentication system. A method may include determining, by a network-based authentication system, a plurality of rules that were previously used to evaluate a plurality of transactions. The method may also include, generating, by the network-based authentication system, a false positive rate for one or more of the plurality of rules. The false positive rate may include a number of negative applications of a rule to the plurality of transactions and a number of positive applications of the rule to the plurality of transactions. The method may further include generating, by the network-based authentication system, a cleaning coefficient for a first rule of the plurality of rules. The cleaning coefficient may identify a degree of overlap between the first rule of the plurality of rules and at least a second rule of the plurality of rules. The method may further include identifying, by the network-based authentication system, one or more rules from the plurality of rules to eliminate from the plurality of rules, based on the cleaning coefficient and the false positive rate. After identifying the one or more rules to eliminate, the method may include eliminating, by the network-based authentication system, one or more rules to generate a modified set of rules, based on the identified one or more rules to eliminate. Using the modified set of rules, the method may include authenticating, by the network-based authentication system, a network-transaction based on the modified set of rules.

In some embodiments, the method may further include determining a normal false positive rate for one or more of the plurality of rules, applying one or more of the plurality of rules to a plurality of control transactions, determining a control false positive rate for the one or more of the plurality of rules as applied to the plurality of control transactions, and comparing the normal false positive rate to the control false positive rate. Optionally, the method may further include training, based on the identified one or more rules to eliminate, a machine learning module. In some embodiments, generating the cleaning coefficient may include applying a statistical model to the plurality of rules and the plurality of transaction to determine a degree of overlap for one or more of the plurality of rules. For example, the statistical model may include a Lasso statistical model. In some instances, the method may further include determining a firing frequency for one or more of the plurality of rules. The firing frequency may include a number of times the rule is triggered during a time period.

A non-transitory computer-readable storage medium having stored thereon instructions for rule cleaning is also provided herein. The instructions may include determining a plurality of rules that were previously used to evaluate a plurality of transactions and generating a false positive rate for one or more of the plurality of rules. The false positive rate may include a number of negative applications of a rule to the plurality of transactions and a number of positive applications of the rule to the plurality of transactions. The instructions may further include generating a cleaning coefficient for one or more of the plurality of rules. The cleaning coefficient may identify a degree of overlap between a first rule of the plurality of rules and at least a second rule of the plurality of rules. The instructions may further include identifying, based on the cleaning coefficient and the false positive rate, one or more rules from the plurality of rules to eliminate from the plurality of rules and eliminating, based on the identified one or more rules to eliminate, one or more rules to generate a modified set of rules.

In some embodiments, the instructions may further include determining a normal false positive rate for one or more of the plurality of rules, applying one or more of the plurality of rules to a plurality of control transactions, determining a control false positive rate for the one or more of the plurality of rules as applied to the plurality of control transactions, and comparing the false positive rate to the normal control false positive rate. Optionally, the instructions may further include training, based on the identified one or more rules to eliminate, a machine learning module. In some cases, generating the cleaning coefficient may include applying a statistical model to the plurality of rules and the plurality of transaction to determine a degree of overlap for one or more of the rules in the plurality of rules. For example, the statistical model may include a LASSO statistical model. In some embodiments, the instructions may further include determining a firing frequency a first rule in the plurality of rules. The firing frequency may include a number of times the first rule is triggered during a time period.

A system for cleaning rules is also described herein. The system may include one or more processors and a memory coupled with the one or more processors. The memory may be configured to store instructions that when executed by the one or more processors cause the one or more processors to determine a plurality of rules previously used to evaluate a plurality of transactions and generate a false positive rate for one or more of the plurality of rules. The false positive rate may include a number of negative applications of a rule to the plurality of transactions and a number of positive applications of the rule to the plurality of transactions. The instructions may further cause the one or more processors to generate a cleaning coefficient for one or more of the plurality of rules. The cleaning coefficient may identify a degree of overlap between a first rule of the plurality of rules and at least a second rule of the plurality of rules. The instructions may further cause the one or more processors to identify, based on the cleaning coefficient and the false positive rate, one or more rules from the plurality of rules to eliminate from the plurality of rules. The instructions may further cause the one or more processors to eliminate, based on the identified one or more rules to eliminate, one or more rules to generate a modified set of rules and authenticate a network-transaction based on the modified set of rules.

The instructions that when executed by the one or more processors may further cause the one or more processors to determine a normal false positive rate for one or more of the plurality of rules, apply one or more of the plurality of rules to a plurality of control transactions, determine a control false positive rate for the one or more of the plurality of rules as applied to the plurality of control transactions, and compare the control false positive rate to the normal false positive rate. Optionally, the instructions that when executed by the one or more processors may further cause the one or more processors to train, based on the identified one or more rules to eliminate, a machine learning module. In some cases, to generate the cleaning coefficient the instructions that when executed by the one or more processors may further cause the one or more processors to: apply a statistical model to the plurality of rules and the plurality of transactions to determine a degree of overlap for one or more of the rules in the plurality of rules. For example, the statistical model may include a LASSO statistical model. In some embodiments, the instructions that when executed by the one or more processors may further cause the one or more processors to determine a firing frequency for a first rule in the plurality of rules. The firing frequency may include a number of times the first rule is triggered during a time period.

BRIEF DESCRIPTION OF THE DRAWINGS

Features, embodiments, and advantages of the present disclosure are better understood when the following Detailed Description is read with reference to the accompanying drawings.

FIG. 2 provides a table illustrating trigger frequencies of various rules, according to some embodiments described herein.

FIG. 4 provides a table illustrating fraud rates based on a number of rules triggered within various time segments, according to some embodiments described herein.

FIG. 5 provides a table illustrating varying lambdas for different transaction statistics for a normal group and a control group, according to some embodiments described herein.

DETAILED DESCRIPTION

Figure 1:
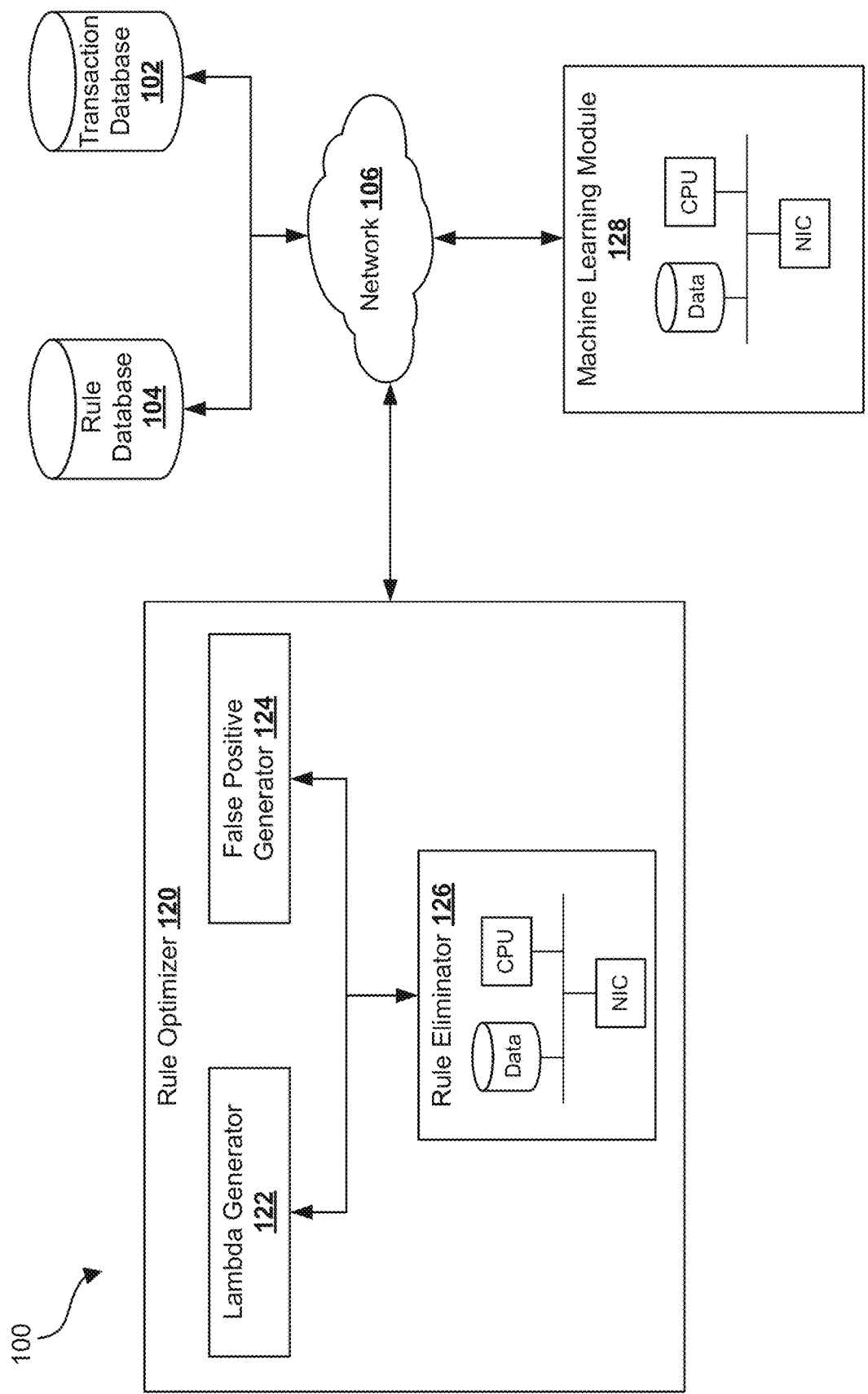
FIG. 1 illustrates a network-based authentication system including a rule optimizer and machine learning module, according to some embodiments described herein.

Embodiments disclosed herein relate generally to techniques and systems for optimizing and cleaning rules for network-based authentication transactions. More specifically, embodiments described herein disclose systems and processes for removing obsolete or poor performing authentication rules from multiple rules used to mitigate or minimize fraudulent activity. The systems and processes also provide for identifying and removing duplicative or overlapping rules. In some embodiments, rules may be utilized by a rule engine developed to prevent fraudulent activity on a network. However, due to the dynamic behavior of fraudulent activity, one or more of the rules within the rule engine may become obsolete or ineffective at preventing new fraudulent activity. For example, one or more rules within a network-based authentication system may be directed to preventing card-based transactions which are not verified by a PIN. Over time, bad actors may develop a PIN generator that is able to identify the verification PIN and proceed with a fraudulent network-based transaction. Because the bad actors are able to proceed with the fraudulent transaction despite rules requiring a verification PIN, these rules have become inadequate at stopping fraudulent transactions and are no longer effective.

Techniques disclosed herein may remove or minimize rules which overlap or are duplicative. Authentication systems or rule engines often utilize thousands of rules (e.g., from 1 to 10,000 different rules) to mitigate and minimize fraudulent activity. Because rules are added over time to address new fraudulent activity, many times rules overlap with each other. Overlapping rules may mean that more than one rule addresses and minimizes the same fraudulent behavior as another rule. In other words, the same fraudulent behavior may be prevented (e.g., minimized or mitigated) by more than one rule. In some embodiments, a rule may be defined as a condition that once met, a decision as to the triggering activity is made. For example, if a credit card was used fraudulently in a previous transaction, then a rule may reject the next transaction (e.g., prevent a data transfer).

Due to the volume of rules utilized by authentication systems, it may be advantageous to reduce the number of rules. Storage of the rules may be costly and application of the numerous rules may slow processing time of the authentication system. Because the rules are meant to prevent fraudulent activity, every transaction or activity must pass every rule in the authentication system. Thus, the higher volume of rules, the slower the transaction may be. Reducing the number of rules while maintaining the coverage of fraud prevention of the authentication system by reducing duplicative or overlapping rules may reduce the cost of the authentication system and improve processing times of the authentication system, such as on a transaction-by-transaction basis.

Conventionally, removal of obsolete or poor performing rules is done manually by searching through the one or more databases housing the rules. Generally, identification of obsolete or poor performing rules is done on a rule-by-rule basis. This means that manual techniques of removing obsolete or poor performing rules are costly and time consuming. Due to the time-consuming nature of manual cleaning of rules, there is a delayed response and an inability to keep up with the dynamic nature of fraudulent activity. That is, by the time the rules have been cleaned or optimized the fraudulent activity has evolved beyond the present rules and the rules then have to be re-cleaned and re-optimized. Manual cleaning or optimization may never be able to keep up with fraudulent behavior. Moreover, these techniques are unable to detect overlapping or duplicative rules. Accordingly, there is a need for improved systems and techniques for optimizing and cleaning rules used by authentication systems.

Techniques described herein are an improvement to authentication system technology. For example, the techniques and systems herein can be used to improve network-based authentication transaction systems. In other embodiments, the techniques described herein may be used for network security compliance or an authentication system used for network security. For example, the techniques may optimize and clean rules for sending data packets, networking, data transmission, access control lists/rules for firewalls, or other proxy applications in which transmission of certain activity/data is permissible while transmission of other activity/data is impermissible and identified to be prevented.

The techniques and systems described herein may provide for reduced manual intervention for optimizing rules within an authentication system. For example, the techniques and systems herein may allow for automatic data collection, modeling, analysis, and rule elimination recommendations. Reduced manual intervention may provide for more efficient optimization and cleaning of rules within an authentication system. For example, months of analysis needed by manual intervention can be shortened to hours. This reduction in time may also allow for real-time adjustment to the rules to keep up with the dynamic nature of fraudulent activity. Additionally, the techniques and systems herein may improve accuracy of rule optimization and cleaning. Finally, the techniques and systems herein may provide for easy tenability and upgrading of authentication systems. For example, in some embodiments, the authentication system herein may have minimal parameters to adjust, allowing for easy manipulation of metrics to evaluate rule performance and overlap.

FIG. 1 illustrates network-based authentication system 100 in accordance with one or more embodiments described herein. Network-based authentication system 100 can help reduce or eliminate risk associated with various network-based authentication transactions. Network-based authentication system 100 may include one or more processors and one or more sets of memory, such as non-volatile memories. The processor(s) may include single or multicore processors. The processors may operate under the control of software stored in the associated one or more sets of memory. The one or more sets of memory may store instructions, that when executed by the one or more processors cause network-based authentication system 100 to perform one or more functions described herein. In one embodiment, network-based authentication system 100 may be implemented as an application server.

Network-based authentication system 100 may include a rule optimizer 120, a rule identifier (not shown), a rule database 104, and a transaction database 102. Rule database 104 may store a plurality of rules. The plurality of rules may be stored within memory of rule database 104. The memory within rule database 104 may include non-volatile memory, such as, a solid-state drive (SSD) and the like. In some embodiments, rule database 104 may be stored on an internal server associated with network-based authentication system 100. In other embodiments, rule database 104 may be stored on an external server, remote from network-based authentication system 100. Transaction database 102 may store a plurality of transactions. The plurality of transactions may be stored within memory of transaction database 102, which may include non-volatile memory, such as SSD and the like. In some embodiment, transaction database 102 may be stored on an internal server associated with network-based authentication system 100 while, in other embodiments, transaction database 102 may be stored on an external server, remote from network-based authentication system 100.

The plurality of rules stored in rule database 104 may be used by network-based authentication system 100 to prevent (e.g., minimize or mitigate) fraudulent activity associated with a plurality of transactions. The plurality of transactions may include, for example, a plurality of financial transaction, a plurality of security or authorization protocols, or a plurality of data packet transmissions. The plurality of rules may correspond to the plurality of transactions. For example, one or more of the plurality of rules may allow for transmission or performance of some transactions while preventing transmission or performance of other transactions. In other words, the rules govern or filter the triggering or performance of the transactions. In some embodiments, the plurality of rules may include rules for determining rules within a firewall or spam filter (e.g., a proxy that filters incoming/outgoing communication). In other embodiments, the plurality of rules may govern financial transactions and may be used to prevent fraudulent financial transactions (e.g., declining a credit card).

Rule optimizer 120 may remove or otherwise eliminate obsolete or poor performing rules from the plurality of rules stored in rule database 104. In some embodiments, rule optimizer 120 may include hardware and software components for storing data and program instructions, such as one or more processors, one or more sets of memory, such as non-volatile memories, and one or more computer-readable storage media. The one or more memory and/or computer readable storage media may store program instructions that are loadable and executable by the one or more processors. The processor(s) may include single or multicore processors. The processors may operate under the control of software stored in the associated one or more sets of memory. The one or more sets of memory may store instructions, that when executed by the one or more processors cause rule optimizer 120 to perform one or more functions described herein. In one embodiment, rule optimizer 120 may be implemented as an application server.

Depending on the configuration and type of processor(s), the one or more memory of rule optimizer 120 may be stored in volatile memory (such as random access memory (RAM), and/or in non-volatile storage drives, such as read-only memory (ROM, flash memory, etc.). In some cases, the one or more memory may contain data and/or program modules that are immediately accessible to and/or presently being operated and executed by the one or more processors of rule optimizer 120. In some implementation, the one or more memory may include multiple different types of memory, such as static random access memory (SRAM) or dynamic random access memory (DRAM). In some implementations, a basic input/output system, (BIOS), containing the basic routines that help to transfer information between elements within rule optimizer 120, such as during start-up, may typically be stored in non-volatile storage drives. By way of example, and not limitation, the one or more memory of rule optimizer 120 may include application programs, such as server applications or operating systems.

Rule optimizer 120 may also include computer-readable storage media. The computer-readable storage media may contain program code, or portions of program code, and may include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD ROM, digital versatile disk (DVD), or other optical storage, magnetic cassettes, magnetic tapes, magnetic disk storage or other magnetic storage devices, or other tangible computer readable media, such as data signals, data transmission, or any other medium which can be used to transmit the desired information and which can be accessed by rule optimizer 120 or the one or more processors of rule optimizer 120.

By way of example, the computer-readable storage media may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for rule optimizer 120.

In some cases, rule optimizer 120 may include one or more communications subsystems for providing a communication interface from rule optimizer 120 and external computing devices via one or more communication networks, including local area networks (LANs), wide area networks (WANs) (e.g., the Internet), and various wireless telecommunications networks. The communications subsystem may include, for example, one or more network interface controllers (NICs), such as Ethernet cards, Asynchronous Transfer Mode NICs, Token Ring NICs, and the like, as well as one or more wireless communications interfaces, such as wireless network interface controllers (WNICs), wireless network adapters, and the like. Additionally and/or alternatively, the communications subsystem may include one or more modems (telephone, satellite, cable, ISDN), synchronous or asynchronous digital subscriber line (DSL) units, FireWire® interfaces, USB® interfaces, and the like. In some cases, the communications subsystem also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem may be detachable components coupled to rule optimizer 120 via a computer network, a FireWire® bus, or the like, and/or may be physically integrated into rule optimizer 120. In some cases, the communications subsystem also may be implemented in whole or in part by software.

In some embodiments, the communications subsystem may also receive input communication in the form of structured and/or unstructured data feeds, event streams, event updates, and the like, on behalf of one or more users who may use or access rule optimizer 120. In some cases, communications subsystem may be configured to receive data in the form of continuous data streams, which may include event streams of real-time events and/or event updates (e.g., sensor data applications, financial tickers, network performance measuring tools, clickstream analysis tools, etc.). The communications subsystem may output such structured and/or unstructured data feeds, event streams, event updates, and the like to one or more data stores that may be in communication with one or more streaming data source computers coupled to rule optimizer 120.

Due to the ever-changing nature of computers and networks, the description of rule optimizer 120 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

To remove poor performing or obsolete rules, rule optimizer 120 may access one or more rules from rule database 104 and access one or more transactions associated with the accessed one or more rules from transaction database 102. To access the one or more rules and associated transactions, rule optimizer 120 may be in communication with the rule identifier. The rule identifier may access rule database 104 and transaction database 102 using network 106. Network 106 may include one or more wired or wireless connections to facilitate the transfer of data between the rule identifier, rule database 104, and transaction database 102. The wired or wireless connections may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. For example, the rule identifier may be connected to rule database 104 and transaction database 102 via a local area network (LAN), a wide-area network, the Internet, a wireless network (e.g. a network operating under any of the Institute of Electrical and Electronics (IEEE) 802.11 suite of protocols, Bluetooth, and/or any other wireless protocol), cellular broadband connections (e.g., 4G, 5G, WiMax), and/or any combination of these. In some embodiments, the rule identifier may be connected to rule database 104 via a different type of network than transaction database 102.

The rule identifier may access transaction database 102 and identify a plurality of transactions. The plurality of transactions may be identified based on one or more attributes. For example, attributes may include a type of transaction, a time period in which the transaction occurred, a transaction corridor indicating sender location and receiver location, platforms including website and APP, device such as mobile and desktop, and/or a group user initiating the transaction. Various types of transactions may include financial instrument used for transaction (e.g., debit card, credit card, points, etc.), environment of transaction (e.g., online, in-person, etc.), and geographical region of transaction (e.g., local or remote). In some instances, the plurality of transactions may be identified based on more than one attribute, such as for example, a type of transaction initiated by a group of users within a specified time period.

In some embodiments, the plurality of transactions may be identified by a group of users initiating the transaction. Users may be grouped by the number of transactions associated for each user stored in transaction database 102. For example, a first group of users may include users who each have initiated more than 1,000 transactions, a second group of users may include users who have initiated more than 100 transactions, but not more than 1,000 transactions, and a third group may include users who have initiated less than 100 transactions. The first group may indicate that a user has been with a financial institution for a long period of time (e.g., a longtime customer/user) and therefore the transaction database 102 has a high volume of data relating to that respective user. In contrast, the third group may indicate that a user has been with the financial institution for a short period of time (e.g., a new customer/user) and therefore the transaction database 102 has a low volume of data relating to that respective user.

In some embodiments, the plurality of transactions may be identified based on the time period that the transaction occurred. As noted above, fraudulent activity is dynamic and can change over time. Therefore, different rules may be triggered at different time periods. This may mean that different time periods of transactions may identify different rules that are performing poorly or obsolete. For example, FIG. 2 provides an exemplary table 200. Table 200 provides exemplary five exemplary rules and indicates the number of times each rule was triggered in a given time period. The five exemplary rules are provided in column 205. In subsequent columns following to the right of column 205, are a range of time periods. For example, column 206 may correspond to the month of April 2018, column 207 to May 2018, column 208 to June 2018, and so on. In the rows for each column are values corresponding to the rules provided in column 205. The values in each cell of a column, such as column 206, 207, or 208 may correspond to the number of times the corresponding rule was triggered during that time period. For example, the first rule in column 205, rule DecACHT1DMSameState, was triggered zero times between April 2018 and June 2018. However, rule DecACHT1DMSameState was triggered 809 times in July of 2018, 2,079 times in August of 2018, 1,892 times in September of 2018, and 2,531 times in October of 2018.

Turning back to FIG. 1, the rule identifier may access rule database 104 and identify one or more rules associated with the identified transactions. For example, a single transaction may trigger multiple rules. After identifying the triggered rules, the rule identifier may associated each transaction with the one or more rules that the transaction triggered. Each transaction may have one or more rule associated with the transaction. Once each transaction is associated with rules which the transaction triggered, the rule identifier may transmit the plurality of transactions and the plurality of rules associated with the plurality of transactions to rule optimizer 120.

Rule optimizer 120 may include a lambda generator 122. Lambda generator 122 may determine a degree of overlap for the plurality of rules. A degree of overlap may correspond to two or more rules resulting in the same outcome for the plurality of transactions. For example, two rules may prevent the same fraudulent transaction. A degree of overlap may correspond to same number of transactions that two or more rules prevent or allow. If two different rules prevent the same transactions while allowing the same transactions, then the two rules are considered duplicative having near complete overlap. In contrast, one rule may prevent only a percentage of transactions prevented by another rule. This may indicate a lower degree of overlap. Finally, if two rules do not prevent any of the same transactions, then the rules may be considered to have minimal to no degree of overlap.

Lambda generator 122 may use a statistical model to determine the degree of overlap. Exemplary statistical models that may be used by lambda generator 122 may include a LASSO (least absolute shrinkage and selection operator) model. In an exemplary embodiment, the lambda generator 122 using a LASSO model may use a regression analysis method to perform both variable selection and regularization in order to enhance the prediction accuracy and interpretability of the produced statistical model.

Rule optimizer may also include a false positive generator 124. False positive generator 124 may determine a false positive rate for one or more of the plurality of rules. The false positive rate may be defined as the number of times a rule declined a true transaction over the number of times the rule declined a fraudulent transaction. To determine a false positive rate, false positive generator may evaluate a rule in the plurality of rules provided by the rule identifier to determine a number of true transactions that a given rule declined or prevented from transmitting and determine a number of fraudulent transactions that the given rule declined or prevented from transmitting. For example, a rule may prevent a data packet that is meant to be transmitted and may prevent two fraudulent data packets from being transmitted. Here, the rule would have a 50% false positive rate. In some embodiments, the number of true transactions that a rule prevented from transmitting may be known as a negative application and the number of false or fraudulent transactions that a rule prevented from transmitting may be known as a positive application. Additionally, as used herein, it is understood that transmitting of a transaction may include transmission of a transaction or completion of a transaction.

Rule optimizer 120 may also include a rule eliminator 126. Rule eliminator 126 may provide a report on the plurality of rules indicating which rules may be removed or eliminated. The report may indicate which rules are performing poorly or ineffectively. The report may also indicate overlapping or duplicative rules that can be removed with minimal-to-no impact on the outcome of prevented vs. allowed transactions or that can improve the accuracy of the plurality of transactions. In some embodiments, the report may be known as an elimination report or a rule report.

Rule eliminator 126 may be implemented using dedicated hardware within network-based authentication system 100, or using designated hardware and software resources shared with rule optimizer 120. For example, rule eliminator 126 may include a data store, one or more processors, and one or more network interface controllers (NICs), such as Ethernet cards, Asynchronous Transfer Mode NICs, Token Ring NICs, wireless NICs (WNICs), wireless adaptors, and the like. In some embodiments, rule eliminator may be implemented as a software component by the hardware of rule optimizer 120.

In some embodiments, rule optimizer 120 may include and a machine learning module 128. In response to the dynamic nature and sophistication of bad actors, embodiments herein may implement a self/assisted learning statistical model that allows for real-time analysis of fraudulent transactions. Machine learning module 128 may include a learning statistical model that is embodied as a predictive model that uses one or more machine learning techniques to determine if a transaction is in fact unauthorized (e.g. fraudulent). The learning statistical model of machine learning module 128 may be trained based on rule optimizer 120, specifically on past rules identified for removal or elimination and attributes associated with the identified rules to eliminate. Attributes of an identified rules for elimination may include a plurality of factors, such as, but not limited to attributes associated with an identification of a user initiating a transaction, identification of a type of transaction, identification of wording within a rule, a country that is the source or destination of a transaction, a postal code associated with a transaction, identification of the scope or specificity of a rule, and the like. Machine learning module 128 may also identify rules to eliminate based on rule triggering frequency, performance regarding false positive rate, rule overlaps likelihood, and the like. The learning statistical model may utilize one or more aggregation models such as distinct count, summation, averages, standard deviation, Z-scores, minimums, maximums, ranges, and the like to determine a score in order to determine obsolete and poorly performing rules in real-time.

In some embodiments, machine learning module 128 may be implemented using dedicated hardware within network-based authentication system 100, or using designated hardware and software resources shared with rule optimizer 120. For example, machine learning module 128 may include a processing system having one or more processors. A memory associated with the one or more processors may host, train and execute a machine learning module to determine one or more rules within a rule database, such as rule database 104, to eliminate.

Machine learning module 128 may also include a data store and one or more NICs or WNICs for communicating with a communications network, such as network 106. In some embodiments, machine learning module 128 may be implemented as a software component by the hardware of rule optimizer 120.

Machine learning model 128 may be trained by historical rules eliminated by rule optimizer 120. Specifically, machine learning module 128 may determine rules that were previously maintained in rule database 104 but have performed poorly or ineffectively since the previous iteration of rule elimination. For example, as explained in greater detail below, machine learning module 128 may identify a previously identified set of rules for elimination based on a selected lambda. Machine learning model 128 may then determine whether elimination of the identified set of rules improved the effectiveness and coverage of network-based authentication system 100. For example, machine learning module 128 may determine whether there has been an increase or decrease in true or false transactions since elimination of the identified set of rules. Machine learning model 128 may then determine the degree of increase or decrease in true or false transactions. Then based on the degree of increase or decrease of true and false transactions, machine learning module 128 may adjust the lambda used to identify rules to eliminate. For example, if on a previous iteration, a lambda of 0 was used to identify a set of rules to eliminate and elimination of the identified rules resulted in a decrease of only one false transaction, then machine learning module 128 may increase lambda to 0.1 to identify rules to eliminate. The iteration process within machine learning module 128 may continue based on previously lambdas used to eliminate rules, the results of elimination rules (e.g., number of true and false transactions after a set of rules is eliminated), and current fraudulent activity triggering the rules within rule database 104.

In some embodiments, if there is limited historical data for a rule (e.g., due to new fraudulent activity or a new rule), machine learning module 128 may be implemented by a random forest-based prediction model. In random forest classification, a processing system may utilize a plurality of different decision trees where each decision tree is trained based on different lambdas to determine if elimination of one or more rules may change the amount of resulting true or false transactions. For example, a first decision tree may determine a number of rules to eliminate based on a lower lambda, such as a lambda=0.0. A second decision tree may determine a number of rules to eliminated based on a slightly higher lambda, such as a lambda=0.4. A third decision tree may determine a number of rules to eliminate based on a higher lambda, such as a lambda of 0.8. For each decision tree, a number of true transactions and a number of false transactions may be determined. Based on the determined number of true and false transactions, a quantifiable estimate of a backend effect to network-based authentication system 100 may be determined. By training each decision tree based on different lambdas, the total backend effect from each decision tree may improve the accuracy of machine learning module 128 for determining rules to eliminated based on a varying lambda.

Although the above discussion is with regards to lambda, machine learning module 128 may implement similar techniques and processes for cleaning coefficients, false positive rates, and attributes used to identify rules for elimination.

Figure 3:
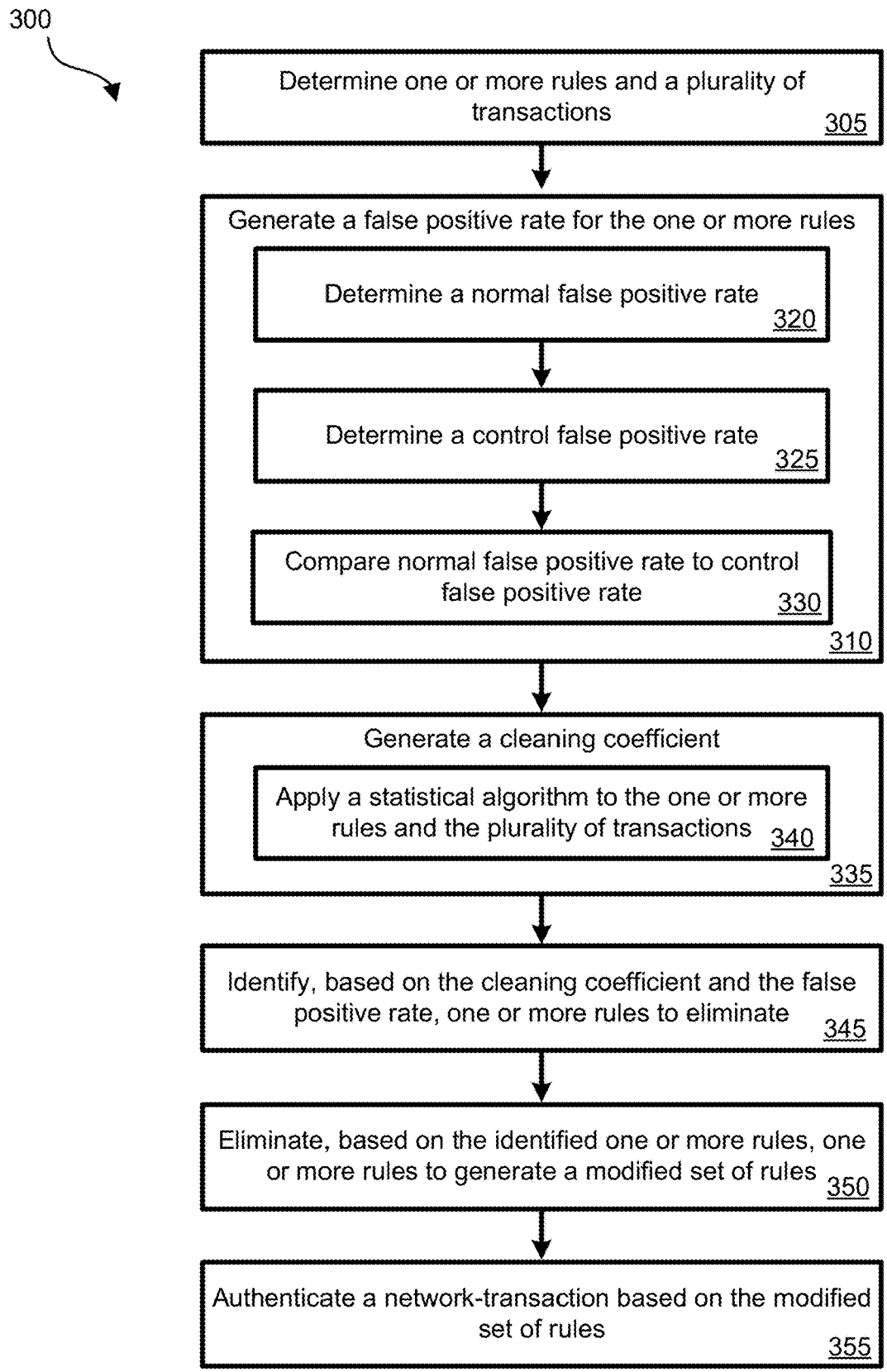
FIG. 3 illustrates an exemplary method for managing rules within a network-based authentication system, according to some embodiments described herein.

FIG. 3 illustrates process 300 in accordance with one or more embodiments described herein. One or more operations of process 300 may be performed by one or more parts of network-based authentication system 100 as depicted in FIG. 1. For example, the rule identifier and/or rule optimizer 120 may perform one or more operations associated with process 300. Process 300 may be a process for training a machine learning module, such as a model implemented by machine learning module 128 to produce a report associated with one or more rules to eliminate.

Process 300 may include step 305. At step 305, process 300 may include determining one or more rules and a plurality of transactions. The one or more rules may be determined rule optimizer 120. Based on the identified one or more rules, a rule identifier may identify a plurality of associated transactions. Determining the one or more rules may include identifying one or more attributes of the plurality of transactions or rules. As noted previously, exemplary attributes may include a type of transaction, a time period in which the transactions occurred, and/or a user initiating the transaction. For ease of discussion, FIG. 3 is described with relation to FIGS. 4-8.

FIG. 4 provides exemplary table 400 illustrating one or more rules and an associated plurality of transactions identified according to an attribute. Table 400 illustrates a normal data set identified as normal group 410. Normal group 410 may correspond actual data gathered with respect to the one or more rules triggered by the plurality of transactions.

For normal group 410, table 400 includes column 420 which provides various time segments for which the plurality of rules and associated plurality of transactions are identified. As illustrated in column 420, time segments may include 0.0, 1.0, 2.0, 3.0, 4.0, and 5.0. Each of these time segments may correspond to a given time period, such as for example, an hour, a day, a week, a month, or any other interval of time. For each of the time segments, one or more rules are identified in column 420. For example, for time segment 0.0, 44 rules are identified, for time segment 1.0, 240 transactions are identified, and for time segment 2.0, 161 transactions are identified.

The rules identified in column 430 may be associated with a plurality of transactions provided in column 435. The rules identified in column 430 may correspond to rules triggered by the plurality of transactions in column 435. For example, during time segment 0.0, 44 rules were triggered by at least one of the 378 transactions in column 435. Similarly, during time segment 1.0, 240 rules were triggered by at least one of the 789,168 transactions in column 435. It is important to note, that in some embodiments, the plurality of transactions during a given time segment may be identified and then one or more rules associated with the identified plurality of transactions may be determined.

Table 400 also includes columns 440 and 445. Column 440 provides the number of fraudulent transactions within each time segment. For example, during time segment 0.0, nine of the transactions in the 378 transactions in column 435 were fraudulent. Similarly, during time segment 3.0, 22,796 transactions of the 155,837 transactions in column 435 were fraudulent. Based off of the number of fraudulent transactions in column 440 and the plurality of transactions in column 435, a fraud rate for each time segment may be calculated and provided in column 445. For example, the fraud rate for time segment 0.0 may be 0.024, for time segment 1.0 may be 0.125, and for time segment 2.0 may be 0.235.

After one or more rules triggered by a plurality of transactions have been identified, process 300 may include step 310. At step 310, a false positive rate for the one or more of the plurality of rules may be generated. A false positive rate may be defined as the number of true transactions that a given rule declined or prevented from transmitting over the number of fraudulent transactions that the given rule declined or prevented from transmitting as corrected by a control. To determine a false positive rate for one or more rules, process 300 may include steps 320, 325, and 330. At step 320, a normal false positive rate may be determined, at step 325, a control false positive rate may be determined, and at step 330, the normal false positive rate may be compared to the control false positive rate.

FIG. 5 may provide an exemplary data set illustrating step 310. FIG. 5 provides table 500. Table 500 includes group a normal group 510 corresponding to an actual data set and includes control group 520 corresponding to a control data set. Because fraudulent transactions are only seen when a fraudulent transaction is approved or allowed to transpire, fraudulent transactions that are prevented or declined are not captured by normal group 510. In this manner, the accuracy of a rule (e.g., the number of fraudulent transactions a rule prevents) is not represented by normal group 510. To correct for this, control group 520 is used. In some embodiments, to gather data for control group 520, the same rules that are identified in normal group 510, are applied to a control set of transactions. However, in control group 520, fraudulent transactions that would be declined or prevented by the rules are approved. On table 500, num_dcc_good may correspond to the number of true transactions that the one or more identified rules declined or prevented from transmitting and num_dcc_bad may correspond to the number of bad or fraudulent transactions that the one or more identified rules declined or prevented. As shown, normal group 510 may have 564,361 transactions that fall into the num_dcc_good category and are true transactions that the one or more rules declined or prevented from occurring and control group 520 may have 1,798 transactions that fall into the num_dcc_ good category and are true transactions that the one or more rules declined or prevented from occurring. Similarly, normal group 510 may have 43,487 transactions that fall into the num_dcc_bad category and are false or fraudulent transactions that the one or more identified rules declined or prevented and control group 520 may have 676 transactions that fall into the num_dcc_bad category and are false or fraudulent transactions that the one or more identified rules declined or prevented. Based on these transactions, normal group 510 may have a false positive rate of 13.01 and control group 520 may have a false positive rate 2.66.

A higher false positive rate may correspond to an increased poor performance of the one or more identified rules because a higher false positive rate indicates that one or more rule is preventing true or permissible transactions from occurring while only preventing a decreased number of fraudulent transactions. However, as noted previously, a false positive rate for normal group 510 may not accurately represent the trigger rate of the one or more identified rules because prevented fraudulent transactions may not be captured by the data. To adjust for this, the false positive rate for normal group 510 may be compared to the false positive rate for control group 520. This may correspond to step 330. Using table 500 as an example, a comparison of the false positive rates for normal group 510 and control group 520 may indicate that the false positive rate for normal group 510 inaccurately represents the accuracy and poor performance of the one or more identified rules. Here, normal group 510 has a false positive rate of 13.01 while control group has a false positive rate of 2.6. A false positive rate of 13.01 indicates an worse performance a false positive rate of 2.66. This may indicate that the data used for normal group 510 underrepresents the number of fraudulent transactions that the one or more identified rules prevented. Because control group 520 captures the number of fraudulent transactions that are prevented, the false positive rate for control group 520 may be used to determine the one or more rules to eliminate. In some embodiments, the false positive rate of normal group 510 may be used to evaluate non-decline rules such as rules approving low risk transactions, while the false positive rate of control group 520 may be used to evaluate all rules using the false positive rate of normal group 510 as a reference when the control group 520 volume is not sufficient to draw conclusion. Based on the comparison of the normal group 510 false positive rate to the control group 520 false positive rate, a false positive rate for the one or more identified rules may be generated.

After a false positive rate for the one or more rules is generated, process 300 may include step 335. At step 335, a cleaning coefficient may be generated. In some embodiments, a cleaning coefficient may be generated for each of the one or more rules, while in other embodiments, a cleaning coefficient may be generated for a group or category of rules instead of on a rule-by-rule basis. The cleaning coefficient may provide a comparison of one or more rules and may provide an analog value for elimination (e.g., a degree to which eliminating a rule will improve performance of authentication system or a rule engine).

In some embodiments, step 335 may include step 340. At step 340, a statistical model may be applied to the one or more rules to generate an elimination report. The elimination report may provide a statistical analysis of one or more rules to eliminate. The one or more rules to eliminate may be rules which are performing poorly or overlap one or more other rules (e.g., duplicative). In some embodiments, step 340 may apply a LASSO model. A lambda may be a variable parameter within the statistical model that allows for a range of results to be generated in the elimination report. For example, the lambda may indicate a degree of strictness or amount of risk permissible by a resulting report. In some embodiments, changing lambda may vary the degree of overlap permissible between the one or more rules. In some cases, lambda or a range of lambdas may be defined by a user of the authentication system.

Table 500 may provide an exemplary embodiment of an elimination report providing a range of results corresponding to different lambdas. Row identifier num_eliminate_r-ules on table 500 may indicate the number of rules to eliminate from the one or more rules. Columns 530, 535, 540, and 545 provide the results from a LASSO model using different lambdas. For example, column 530 provides the result from a LASSO model using a lambda of 0.0, column 535 provides the result from a LASSO model using a lambda of 0.1, column 540 provides the result from a LASSO model using a lambda of 0.2, and column 545 provides the result from a LASSO model using a lambda of 0.3. In some embodiments, a lambda of 0.0 may correspond to a high degree of strictness (e.g., a low amount of risk) permissible under the statistical model. This may be due to a high degree of overlap permissible between rules. A high degree of overlap may allow for multiple overlapping rules to remain in the authentication system because overlapping rules provide the highest degree of coverage against false or fraudulent transactions. As provided by column 530, a lambda of 0.0 may result in zero rules to be eliminated. As such, the number of true transactions prevented from transmission and the number of false or fraudulent transactions prevented from transmission may remain the same as before the one or more rules are subjected to rule optimizer. The lambda of 0.1 may correspond to a higher degree of strictness than lambda 0.0. As provided by column 535, the lambda of 0.1 may result in 11 rules to be eliminated. By eliminating 11 rules from the one or more rules, one of the true transactions that was previously prevented from transmission may now be allowed to transpire. This is indicated by row identifier num_dcc_good_app which stands for number of declined true transactions approved. Zero fraudulent transactions that were previously prevented from transmission are allowed to transpire when 11 rules are eliminated, as indicated by row identifier num_dcc_bad_app.

When the degree of strictness is decreased and the lambda is 0.2 or 0.3, the number of rules identified for elimination under the statistical model may be 15, as provided by both columns 540 and 545. For both lambdas of 0.2 and 0.3, elimination of 15 rules decreases the number of prevented true transactions to 564,345. However, elimination of 15 rules also decreases the number of prevented false or fraudulent transactions to 43,486. In other words, eliminating 15 rules may allow for one false or fraudulent transaction to be approved or transpire, as provided by row identifier num_dcc_bad_app. The benefit of eliminating 15 rules, however, allows for transmission of 16 true transactions that were previously prevented, as provided by row identifier num_dcc_good_app. As illustrated by table 500, the elimination of zero rules, 11, rules and 15 rules, as provided by columns 530, 535, 540, and 545, does not impact the false positive rate. According to the embodiment illustrated in FIG. 5, for both normal group 510 and control group 520, the false positive rate remains the same regardless of the number of rules eliminated. In other embodiments, the number of rules eliminated may change the false positive rate for one or both of a normal group and a control group. The change in the false positive rate may be another factor that is taken into account when determining the number of rules to eliminate.

In some embodiments, process 300 may include a determination step to evaluate the backend effects of eliminating one or more rules under the different lambdas. Exemplary backend effects may include a financial impact, a consumer database impact, a virus breach, or a degree of data loss. Continuing with the exemplary embodiment provided on table 500, row identifiers amt_bad_app, amt_good_app, and amt_diff may provide a quantifiable estimate of the backend effect of eliminating the number of rules under different lambdas. Row identifier amt_bad_app may provide a quantifiable estimate for the backend effect of approving false or fraudulent transactions that were previously prevented. This may represent a loss or negative impact of removing the one or more rules. Row identifiers amt_good_app may provide a quantifiable estimate for the backend effects of approving true transactions that were previously prevented. This may represent a benefit or positive impact of removing the one or more rules. Row identifier amt_diff may represent the net impact of eliminating the one or more rules. For example, amt_diff may correspond to the amt_good_app minus the amt_bad_app. For ease of explanation, the backend effects (e.g., amt_bad_app, amt_good_app, and amt_diff) for the following discussion are described in terms of dollars.

Under column 535, the backend effects of eliminating 11 rules under a lambda of 0.1, may be $50,000. Because eliminating 11 rules allows one true transaction that was previously prevented to transpire and there is no change to the number of false or fraudulent transactions, the net backend effect indicated by amt_diff is equal to the backend effect of approving the one true transaction, indicated by amt_good_app. Under columns 540 and 545, the net backend effect of eliminating 15 rules under a lambda of 0.2 or 0.3 may be $53,630. Eliminating 15 rules may allow one false or fraudulent transaction that was previously presented to transpire. This may have a negative backend effect of $650, indicated by amt_bad_app. However, eliminating 15 rules may allow for 16 previously prevented transactions to transpire. The positive backend effect of allowing the 16 previously prevented transactions to transpire may be $54,280, indicated by amt_good_app. The net backend effect, provided by amt_diff, for eliminating the 15 rules, may be $53,630. When evaluating whether to eliminate 11 rules or 15 rules, the net backend effect or amt_diff may be used. Because $53,630 is greater than $50,000 it may be desirable to eliminate 15 rules over 11 rules despite the one false or fraudulent transaction that is allowed to transpire under lambdas 0.2 and 0.3. Accordingly, one or more rules to eliminate may be identified based on the lambda, corresponding to the backend effects of eliminating rules, and the false positive rate.

Figure 6:
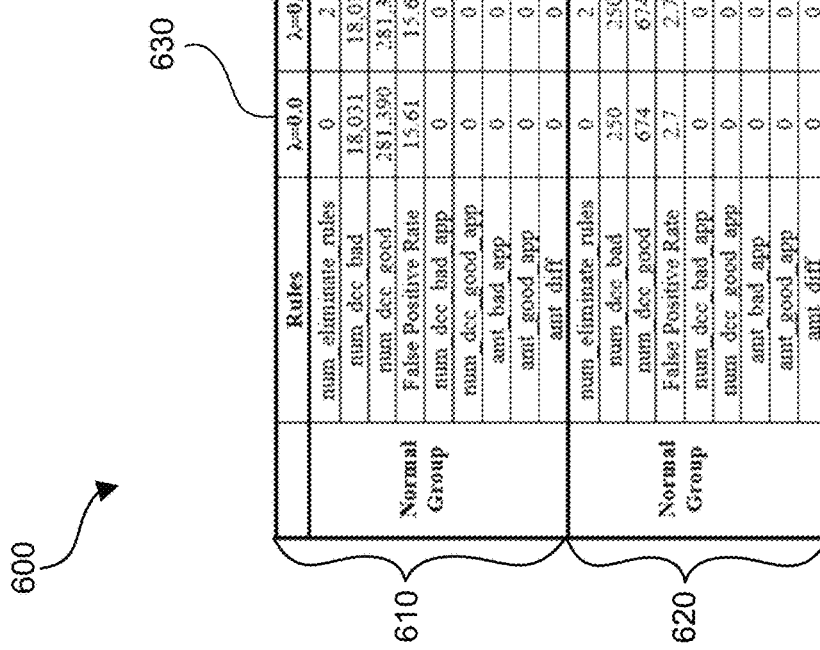
FIG. 6 provides another table illustrating varying lambdas for different transaction statistics for a normal group and a control group, according to some embodiments described herein.

FIG. 6 illustrates an exemplary elimination report generated according to process 300. As provided by table 600, false positive rates for a normal group 610 and a control group 620 are provided for a range of lambdas. For a lambda of 0.0 provided in column 630, where there is no change to the number of rules (e.g., no rules eliminated), the false positive rate for normal group 610 is 15.61 and the false positive rate for control group 620 is 2.7. Similar to the table 500 example, the false positive rate for control group 620 indicates that the data used for normal group 610 does not accurately represent the number of false or fraudulent transactions prevented by the one or more rules.

As the lambdas are increased across table 600, so is the number of rules to eliminate. For example, when lambda is 0.8, 0.9, or 1.0, then 16 rules may be recommended for elimination. For these lambdas, the total backend effect is $451,318. Because a more favorable backend effect (e.g., largest positive backend effect) may be provided by eliminating 16 rules according to lambdas 0.8, 0.9, and 1.0, while maintaining the false positive rate, eliminating the 16 identified rules may be preferred.

Figure 7:
FIG. 7 provides a table illustrating cleaning coefficients for a set of rules, according to some embodiments described herein.

In some embodiments, to identify the one or more rules to eliminate, a cleaning coefficient for each rule may be generated. FIG. 7 illustrates cleaning coefficients generated for one or more rules according to different lambdas. Table 700 provides cleaning coefficients for four rules: DecIPCountryMaxVG, DecUST1ATOFraud, DecUST1OBCC_Verizon, and DeclineVisaHighRisk. As provided by table 700, changing lambda impacts the cleaning coefficient generated for each rule. In some embodiments, this may be due to lambda allowing varying degrees of overlap between the rules. The cleaning coefficient generated for each rule may indicate the performance of the rule and indicate which rules can be removed. For example, a cleaning co-efficient of or below zero may indicate that the rule can be removed. Such cleaning coefficients may indicate that a rule is not performing well. In some embodiments, each cleaning coefficient may be generated using a statistical model, such as a LASSO model. In some cases, the cleaning coefficient for each rule may be used to determining the total number of rules to eliminate. For example, at step 345 of process 300, various LASSO models at different lambdas may be run to identify rules which have a cleaning coefficient below a certain threshold. For example, rules with a cleaning coefficient of or below −2 may be identified as rules for elimination.

Figure 8:
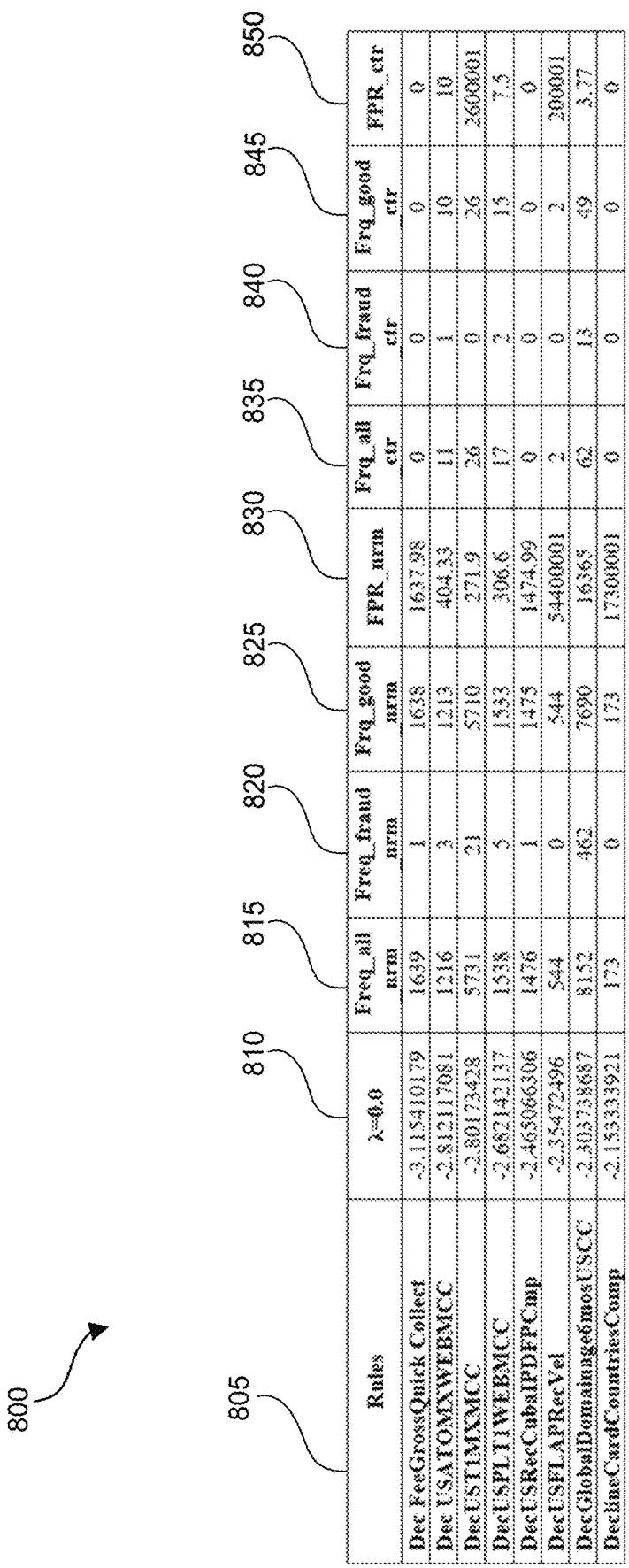
FIG. 8 provides a table illustrating cleaning coefficients and false positive rates for a set of rules, according to some embodiments described herein.

FIG. 8 provides another exemplary elimination report. The exemplary elimination report illustrated by table 800 may be generated using process 300 or a process using some or all of the steps of process 300. As provided by table 800, column 805 may provide a plurality of rules. For each of the rules provided in column 805, a cleaning coefficient may be generated in column 810. The cleaning coefficients provided on table 800 may correspond to a lambda of 0.0. Along with a cleaning coefficient, a firing frequency for each of the rules may be tracked in column 815. The firing frequency may correspond to the number of times each rule is triggered per a given set of transactions. Column 820 may provide the number of false or fraudulent transactions that a given rule prevented from transmitting. Column 825 may provide the number of true transactions that a given rule prevented from transmitting. Based on the values of column 820 and 825, a false positive rate may be calculated for each rule at column 830.

A control false positive rate may also be calculated for each rule in column 805. To calculate the control false positive rate for each rule, the rule may be applied to a control set of transactions. At column 840, the number of false or fraudulent control transactions that each rule prevented from transmitting may be provided. At column 845, the number of true control transactions that each rule prevented from transmitting may be provided. Based on these values, a control false positive rate may be generated at column 850. A control firing frequency may be tracked at column 835. In other words, the number of times a given rule is triggered by the control set of transactions may be tracked at column 835. Based on these statistics, each rule may be analyzed to determine whether the rule can be eliminated and the backend effects of eliminating the rule from the authentication system may determine.

At step 345 of process 300, one or more rules may be identified for elimination. As noted above, the one or more rules for elimination may be identified based on a coefficient, the lambda, the false positive rate, or the backend effects to the network-based authentication system. After a set of rules has been identified for elimination, also known as the identified one or more rules, process 300 may include step 350. At step 350, the identified one or more rules may be eliminated to generate a modified set of rules. In some embodiments, eliminating the rule from the network-based authentication system may correspond to deleting or archiving the rule from rule database 104. The resulting modified set of rules may be the new set of rules within rule database 104 implemented by the network-based authentication system.

At step 355, a network-transaction may be authenticated by the network-based authentication system based on the modified set of rules. For example, the network-based authentication system may apply the modified set of rules to a network-transaction. One or more rules within the modified set of rules may be triggered by the network-transaction and the network-transaction may be authenticated or denied based on the application of the modified set of rules.

In the above description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, models, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A system comprising:
one or more processing devices; and
memory coupled with the one or more processing devices and storing instructions that, when executed by the one or more processing devices, cause the one or more processing devices to perform operations comprising:
determining a plurality of rules that were previously used to evaluate a plurality of financial transactions;
generating a cleaning coefficient for a set of one or more rules of the plurality of rules, wherein the cleaning coefficient indicates how the set of one or more rules of the plurality of rules is performing, where the cleaning coefficient is based at least in part on whether the set of one or more rules prevents one or more financial transactions of the plurality of financial transactions;
identifying the set of one or more rules from the plurality of rules to eliminate from the plurality of rules, based at least in part on the cleaning coefficient, wherein a machine learning module is used to identify the set of one or more rules or is trained using the set of one or more rules;
eliminating at least one rule of the set of one or more rules from the plurality of rules to generate a modified set of rules, based on the identified set of one or more rules to eliminate;
authenticating or preventing a transaction based on the modified set of rules;
identifying a set of one or more attributes associated with the identified set of one or more rules to eliminate; and
training the machine learning module based at least in part on the identified set of one or more attributes associated with the identified set of one or more rules to eliminate.

2. The system as recited in claim 1, the operations further comprising:
determining a triggering frequency corresponding to the set of one or more rules, where the identifying the set of one or more rules from the plurality of rules to eliminate from the plurality of rules is based at least in part on the triggering frequency.

3. The system as recited in claim 1, the operations further comprising:
determining a false positive rate corresponding to the set of one or more rules, where the identifying the set of one or more rules from the plurality of rules to eliminate from the plurality of rules is based at least in part on the false positive rate.

4. The system as recited in claim 1, the operations further comprising:
training, based at least in part on the identified set of one or more rules to eliminate, the machine learning module.

5. The system as recited in claim 1, wherein the generating the cleaning coefficient comprises applying a statistical model to the plurality of rules and the plurality of financial transactions to determine a degree of overlap of the set of one or more rules with respect to a second set of one or more rules of the plurality of rules.

6. The system as recited in claim 1, the operations further comprising:
determining a normal false positive rate for one or more of the plurality of rules;
applying one or more of the plurality of rules to a plurality of control transactions;
determining a control false positive rate for the one or more of the plurality of rules as applied to the plurality of control transactions; and
comparing the normal false positive rate to the control false positive rate.

7. The system as recited in claim 1, wherein the identifying the set of one or more rules from the plurality of rules to eliminate from the plurality of rules is based at least in part on comparing the cleaning coefficient to a threshold coefficient value.

8. One or more non-transitory, computer-readable storage media having stored thereon computer-executable instructions that, when executed by one or more processing devices, cause the one or more processing devices to perform operations comprising:
determining a plurality of rules that were previously used to evaluate a plurality of financial transactions;
generating a cleaning coefficient for a set of one or more rules of the plurality of rules, wherein the cleaning coefficient indicates how the set of one or more rules of the plurality of rules is performing, where the cleaning coefficient is based at least in part on whether the set of one or more rules prevents one or more financial transactions of the plurality of financial transactions;
identifying the set of one or more rules from the plurality of rules to eliminate from the plurality of rules, based at least in part on the cleaning coefficient, wherein a machine learning module is used to identify the set of one or more rules or is trained using the set of one or more rules;
eliminating at least one rule of the set of one or more rules from the plurality of rules to generate a modified set of rules, based on the identified set of one or more rules to eliminate;
authenticating or preventing a transaction based on the modified set of rules;
identifying a set of one or more attributes associated with the identified set of one or more rules to eliminate; and
training the machine learning module based at least in part on the identified set of one or more attributes associated with the identified set of one or more rules to eliminate.

9. The one or more non-transitory, computer-readable storage media as recited in claim 8, the operations further comprising:
determining a triggering frequency corresponding to the set of one or more rules, where the identifying the set of one or more rules from the plurality of rules to eliminate from the plurality of rules is based at least in part on the triggering frequency.

10. The one or more non-transitory, computer-readable storage media as recited in claim 8, the operations further comprising:
determining a false positive rate corresponding to the set of one or more rules, where the identifying the set of one or more rules from the plurality of rules to eliminate from the plurality of rules is based at least in part on the false positive rate.

11. The one or more non-transitory, computer-readable storage media as recited in claim 8, the operations further comprising:
training, based at least in part on the identified set of one or more rules to eliminate, the machine learning module.

12. The one or more non-transitory, computer-readable storage media as recited in claim 8, wherein the generating the cleaning coefficient comprises applying a statistical model to the plurality of rules and the plurality of financial transactions to determine a degree of overlap of the set of one or more rules with respect to a second set of one or more rules of the plurality of rules.

13. The one or more non-transitory, computer-readable storage media as recited in claim 8, the operations further comprising:
determining a normal false positive rate for one or more of the plurality of rules;
applying one or more of the plurality of rules to a plurality of control transactions;
determining a control false positive rate for the one or more of the plurality of rules as applied to the plurality of control transactions; and
comparing the normal false positive rate to the control false positive rate.

14. The one or more non-transitory, computer-readable storage media as recited in claim 8, wherein the identifying the set of one or more rules from the plurality of rules to eliminate from the plurality of rules is based at least in part on comparing the cleaning coefficient to a threshold coefficient value.

15. A method comprising:
determining, by an authentication system, a plurality of rules that were previously used to evaluate a plurality of financial transactions;
generating, by the authentication system, a cleaning coefficient for a set of one or more rules of the plurality of rules, wherein the cleaning coefficient indicates how the set of one or more rules of the plurality of rules is performing, where the cleaning coefficient is based at least in part on whether the set of one or more rules prevents one or more financial transactions of the plurality of financial transactions;
identifying, by the authentication system, the set of one or more rules from the plurality of rules to eliminate from the plurality of rules, based at least in part on the cleaning coefficient, wherein a machine learning module is used to identify the set of one or more rules or is trained using the set of one or more rules;
eliminating, by the authentication system, at least one rule of the set of one or more rules from the plurality of rules to generate a modified set of rules, based on the identified set of one or more rules to eliminate;
authenticating or preventing, by the authentication system, a transaction based on the modified set of rules;
identifying a set of one or more attributes associated with the identified set of one or more rules to eliminate: and
training the machine learning module based at least in part on the identified set of one or more attributes associated with the identified set of one or more rules to eliminate.

16. The method as recited in claim 15, further comprising:
determining a triggering frequency corresponding to the set of one or more rules, where the identifying the set of one or more rules from the plurality of rules to eliminate from the plurality of rules is based at least in part on the triggering frequency.

17. The method as recited in claim 15, further comprising:
determining a false positive rate corresponding to the set of one or more rules, where the identifying the set of one or more rules from the plurality of rules to eliminate from the plurality of rules is based at least in part on the false positive rate.

18. The method as recited in claim 15, further comprising:
training, based at least in part on the identified set of one or more rules to eliminate, the machine learning module.

19. The method as recited in claim 15, wherein the generating the cleaning coefficient comprises applying a statistical model to the plurality of rules and the plurality of financial transactions to determine a degree of overlap of the set of one or more rules with respect to a second set of one or more rules of the plurality of rules.

20. The method as recited in claim 15, further comprising:
determining a normal false positive rate for one or more of the plurality of rules;
applying one or more of the plurality of rules to a plurality of control transactions;
determining a control false positive rate for the one or more of the plurality of rules as applied to the plurality of control transactions; and
comparing the normal false positive rate to the control false positive rate.

\* \* \* \* \*